(12) United States Patent
Danilak

(10) Patent No.: US 9,363,315 B2
(45) Date of Patent: Jun. 7, 2016

(54) INTEGRATED STORAGE AND SWITCHING FOR MEMORY SYSTEMS

(75) Inventor: Radoslav Danilak, Cupertino, CA (US)

(73) Assignee: Skyera, LLC, San Jose, CA (US)

(*) Notice: Subject to any disclaimer, the term of this patent is extended or adjusted under 35 U.S.C. 154(b) by 202 days.

(21) Appl. No.: 13/596,979

(22) Filed: Aug. 28, 2012

(65) Prior Publication Data

US 2014/0067984 A1    Mar. 6, 2014

(51) Int. Cl.
*G06F 15/167* (2006.01)
*H04L 29/08* (2006.01)

(52) U.S. Cl.
CPC .................................. *H04L 67/1097* (2013.01)

(58) Field of Classification Search
CPC .................................................. H04L 67/1097
USPC ......... 709/213, 214, 215, 217, 218, 223, 226, 709/250
See application file for complete search history.

(56) References Cited

U.S. PATENT DOCUMENTS

| | | | |
|---|---|---|---|
| 7,050,301 B2 | 5/2006 | Wong et al. | |
| 7,126,820 B2 | 10/2006 | Wei | |
| 7,345,873 B2 | 3/2008 | Dey et al. | |
| 7,403,385 B2 | 7/2008 | Boone et al. | |
| 7,593,225 B2 | 9/2009 | Sasagawa et al. | |
| 7,848,101 B2 | 12/2010 | Dey et al. | |
| 8,040,683 B2 | 10/2011 | Karabatsos | |
| 8,234,459 B2* | 7/2012 | Gaither et al. | 711/147 |
| 8,514,571 B2 | 8/2013 | Ji et al. | |
| 8,514,584 B2 | 8/2013 | Liang et al. | |
| 2002/0194324 A1* | 12/2002 | Guha | H04L 12/2602 709/223 |
| 2004/0003069 A1* | 1/2004 | Wong | 709/223 |
| 2007/0237158 A1* | 10/2007 | Leef et al. | 370/395.53 |
| 2008/0002362 A1 | 1/2008 | Ishimine | |
| 2008/0080152 A1 | 4/2008 | Duppong et al. | |
| 2010/0332733 A1* | 12/2010 | Suzuki | 711/103 |
| 2013/0100627 A1 | 4/2013 | Cong et al. | |
| 2013/0183913 A1 | 7/2013 | Tevell et al. | |

OTHER PUBLICATIONS

Notice of Allowance for U.S. Appl. No. 13/597,110 mailed on Sep. 3, 2014, 9 pages.
Notice of Allowance for U.S. Appl. No. 13/597,051 mailed on May 22, 2014, 11 pages.

* cited by examiner

*Primary Examiner* — Viet Vu
(74) *Attorney, Agent, or Firm* — Wilmer Cutler Pickering Hale and Dorr LLP

(57) ABSTRACT

An integrated networked storage and switching apparatus comprises one or more flash memory controllers, a system controller, and a network switch integrated within a common chassis. The integration of storage and switching enables the components to share a common power supply and temperature regulation system, achieving efficient use of available space and power, and eliminating added complexity of external cables between the switch a storage devices. Additionally, the architecture enables substantial flexibility and optimization of network traffic policies for both network and storage-related traffic.

17 Claims, 4 Drawing Sheets

INTEGRATED STORAGE AND SWITCHING FOR MEMORY SYSTEMS

RELATED APPLICATIONS

This application is related to U.S. application Ser. No. 13/597,051 entitled "Motherboard with Card Guide Cutouts" to Pinchas Herman, et al. filed on Aug. 28, 2012, and to U.S. application Ser. No. 13/597,110 entitled "Chassis with Separate Thermal Chamber for Solid State Memory" to Pinchas Herman, et al. filed on Aug. 28, 2012, the contents of which are each incorporated by reference herein.

BACKGROUND

1. Field of the Invention

The invention relates generally to networked storage systems and more particularly to an integrated storage and switching system.

2. Description of the Related Arts

In conventional networked storage systems, storage devices typically exist as distinct components on a network that are coupled to one or more network servers via a network switch. FIG. 1 illustrates a common arrangement of a conventional storage system 100. A server rack contains up to 48 servers 102 (e.g., servers 102-1, 102-2, . . . , 102-N) coupled via links 112 (e.g., Ethernet cables) to a switch 106 for routing network traffic to and from the various servers 102 and an uplink network 104. A storage device 108 is configured externally to the server rack and communicates with the servers 202 via the switch 106 using communication links 114 (such as Ethernet cables) that have limited channel bandwidth. A typical network storage device 108 may occupy a single port (or two ports for redundancy purposes) on the network switch 106 and access to the communication link 114 coupling the storage device 108 to the switch 106 is therefore shared by a large number of servers 102 (e.g., a rack of 48 servers). As a result, each server 102 only has access to a small percentage (e.g., about 4% in a 48 rack server) of the bandwidth of the communication link 114 to the storage device 108.

In a conventional storage device 108 using relatively slow storage technology (e.g., hard disk drives), the shared bandwidth of the communication link 112 does not significantly reduce performance because the read/write speed to storage 108 is already limited by the device itself. However, with the development of substantially faster memory devices such as flash memory, the bandwidth limitations of the communication link 114 between the switch 106 and the storage device 108 can become a significant performance bottleneck.

One conventional solution simply uses higher capacity Ethernet cables 114 between the storage device 108 and the switch 106. However, this solution significantly increases the costs of the storage system 100 and is therefore undesirable. Increasing the number of cables between the switch 106 and the storage 108 is also a feasible solution, but this undesirably decreases the number of ports on the switch 106 available for the servers 102, and also adds to overall system costs.

SUMMARY

An integrated networked storage and switching apparatus comprises one or more flash memory controllers, a system controller, and a network switch integrated within a common chassis. The one or more flash memory controllers are configured to manage data stored to one or more flash memory devices. The system controller is coupled to the one or more flash memory controllers. The system controller is configured to control the flash memory controllers in response to requests from one or more externals servers to retrieve data from the one or more flash memory devices or write data to the one or more flash memory devices. The network switch is coupled to the system controller and to the one or more external servers. The network switch is configured to route data storage packets between the one or more external servers and the system controller, and to route network packets between the one or more external servers and an uplink network.

In one embodiment, the one or more flash memory controllers, the system controller, and the network switch of the integrated storage and switching apparatus share a common power supply. Furthermore, in one embodiment, the system controller and the network switch are implemented as integrated circuits on a common printed circuit board. Communication links between the network switch and the system controller are implemented as traces on the printed circuit board without requiring external cabling between separate devices.

Additionally, in one embodiment, the network switch applies different processing policies to packets depending on whether they are data storage packets or network packets. For example, in one embodiment a first traffic prioritization policy is applied to the data storage packets and a second traffic prioritization policy is applied to the network packets. Furthermore, in one embodiment, different Quality of Service metrics (QoS) are applied to storage packets and network packets. Additionally, in one embodiment, different acceptable packet loss limitations are applied to storage packets and to network packets. Thus, the architecture of the integrated switching and storage apparatus enables substantial flexibility and optimization of network traffic policies.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments described herein can be readily understood by considering the following detailed description in conjunction with the accompanying drawings.

DETAILED DESCRIPTION OF EMBODIMENTS

The teachings of the embodiments of the present invention can be readily understood by considering the following detailed description in conjunction with the accompanying drawings.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Furthermore, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

Figure 1:
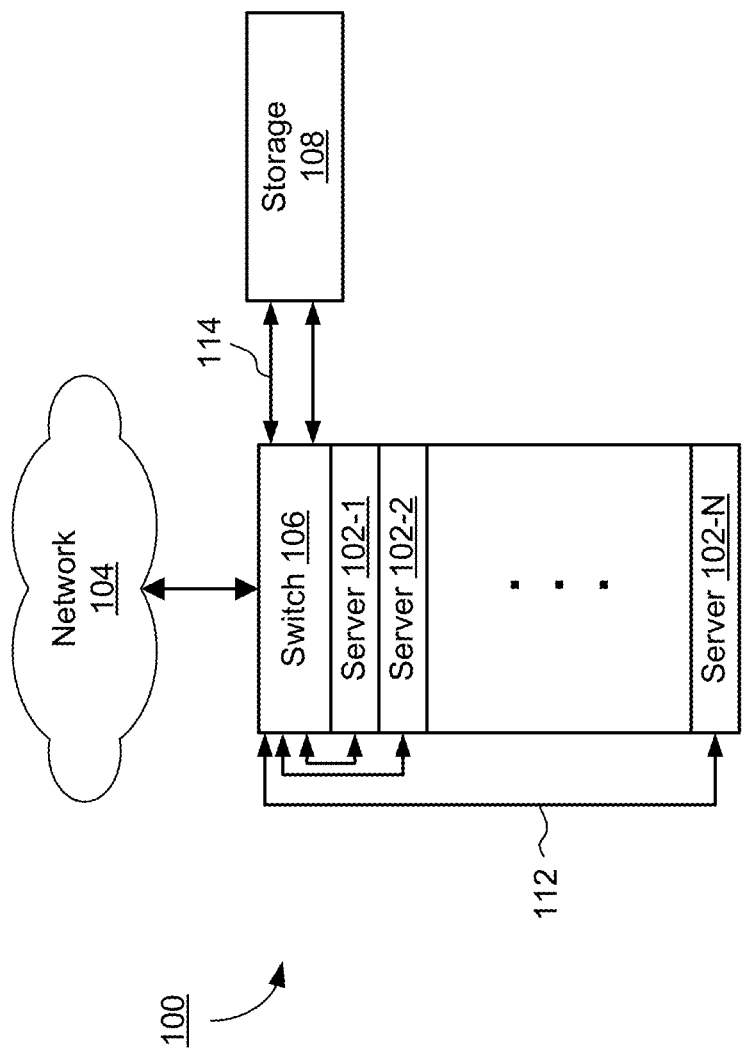
FIG. 1 illustrates an embodiment of a conventional network storage configuration.
Figure 2:
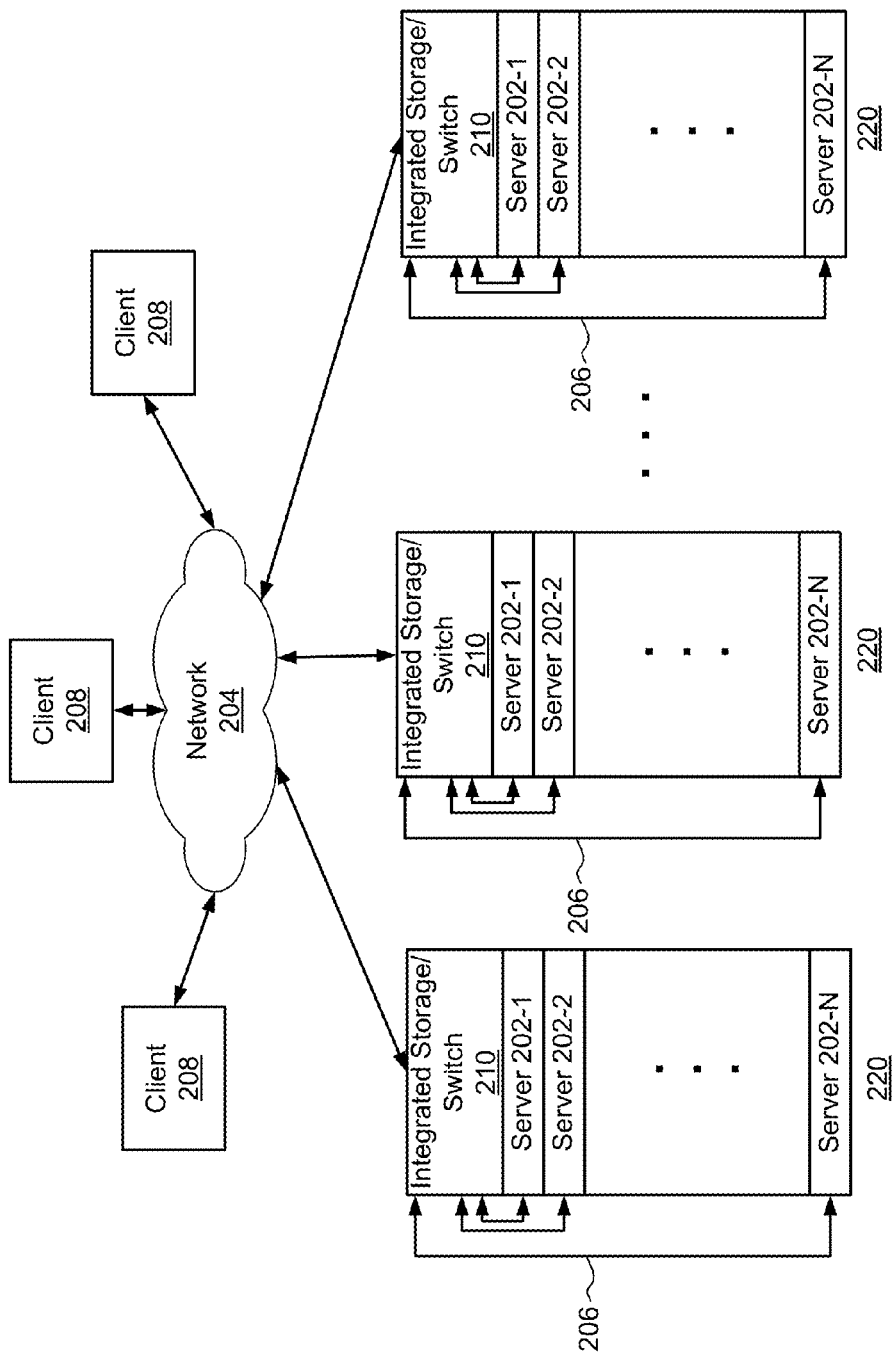
FIG. 2 illustrates an embodiment of a networked computing environment using an architecture that includes an integrated storage and switching apparatus.

FIG. 2 illustrates an embodiment of a networked computing environment 200. The networked computing environment 200 includes a plurality of server racks 220 coupled to an upstream network 204 (e.g., an enterprise network and/or the Internet). A plurality of clients 208 are also coupled to the network 204. Each server rack 220 includes a plurality of servers 202 (e.g., servers 202-1, 202-2, . . . , 202-N) and an integrated storage and switching apparatus 210. Although a server rack 220 may in some embodiments comprise a physical structure that physically groups servers 202 and an apparatus 210 together (i.e., a traditional server rack), this is not necessarily the case, and the server rack 220 may instead simply represent a functional grouping of components.

Servers 202 comprise computers dedicated to executing one or more services to serve the other servers 202 and/or clients 208 coupled to the network 204. Servers 202 may be of various types to perform different types of services. For example, a server 202 may comprise a database server, a file server, a mail server, a print server, a web server, a gaming server, an application server, etc. Each server includes a network interface to communicate to the integrated storage and switching apparatus 210 via the communication links 206, which may comprise physical cables or other communication technologies including, for example, Ethernet cables, Infiniband, PCI Express, microprocessor bus, QuickPath Interconnect (QPI), token ring, fibre channel, or other connectivity technologies.

The integrated storage and switching apparatus 210 provides both network switching and data storage/retrieval functions in an integrated device. For example, in one embodiment, the integrated storage and switching apparatus 210 is embodied in a standard rack-mountable device having, for example, a 1 U form factor. The integrated storage and switching apparatus 210 includes a plurality of external ports for coupling the apparatus 210 to the various servers 202 via the communication links 206 (e.g., Ethernet cables) and for coupling to an upstream network 204. The integrated storage and switching apparatus 210 provides switching functionality to route network and storage traffic between, the servers 202, the network 204, and internal storage of the apparatus 210. Furthermore, the integrated storage and switching apparatus 210 provides one or more high capacity storage devices (e.g., flash memory devices) for storing data. For example, in one embodiment, a single integrated storage and switching apparatus 210 provides 40-50 terabytes of storage using high speed flash memory.

The integrated storage and switching apparatus 210 achieves several important advantages over conventional architectures having separate switching and storage devices. For example, by integrating switching and storage functions within the same physical chassis, significant physical space may be saved in a data center. Furthermore, the integrated storage and switching apparatus 210 eliminates the need for external network cabling between the switch and the storage devices, which enables higher speed communication with decreased complexity and cost, and frees up external ports of the switch for server or network connections. Moreover, power savings may be realized because storage and switching components can share a common power supply and cooling system with a single chassis. Additionally, by utilizing an integrated control mechanism for both routing network traffic and for communicating data to and from storage, the integrated storage and switching system allows for greater flexibility in customizing network and storage traffic policies.

Figure 3:
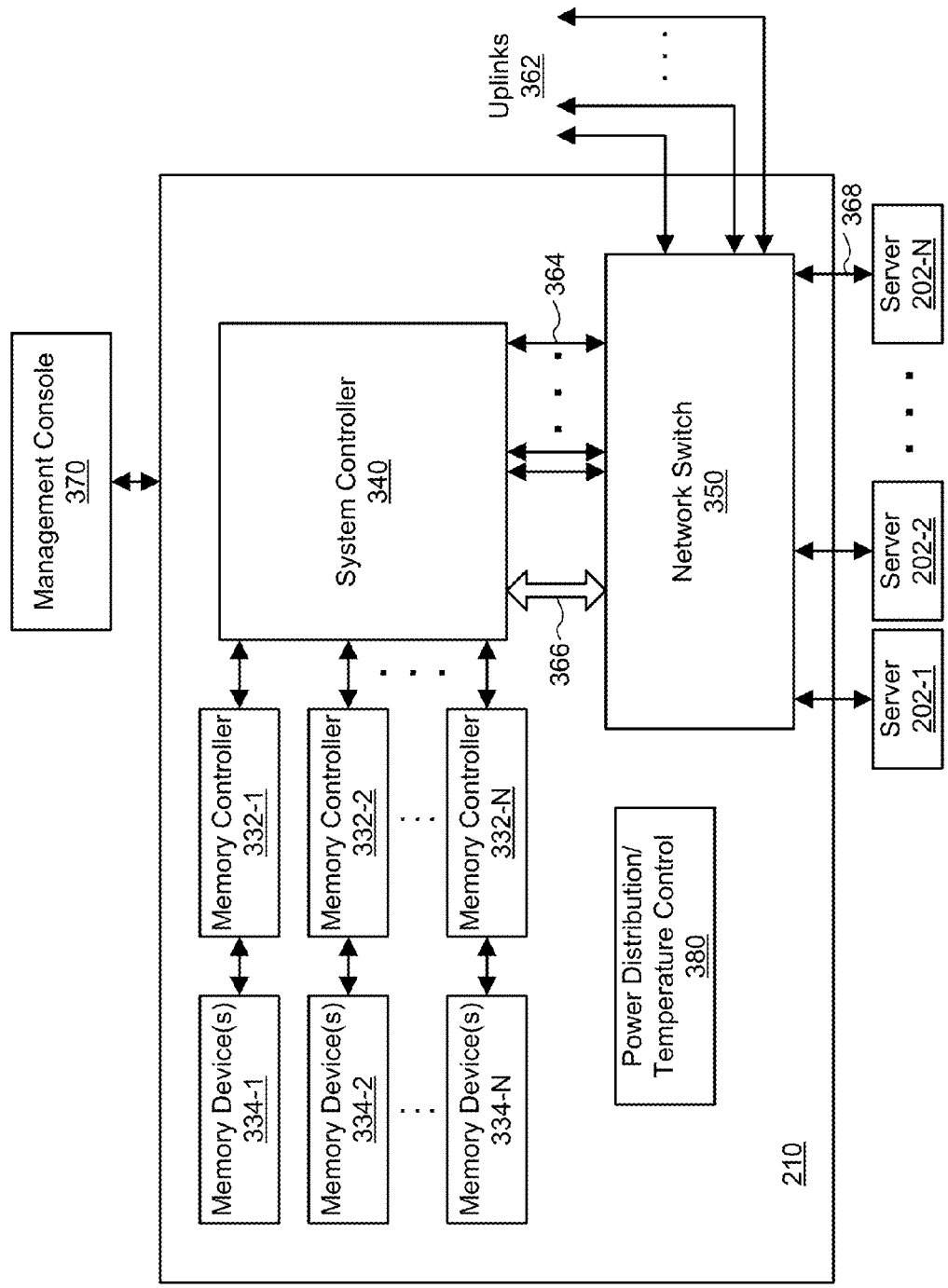
FIG. 3 is a block diagram illustrating an integrated storage and switching apparatus according to one embodiment.

FIG. 3 illustrates an embodiment of the integrated storage and switching apparatus 210. The integrated storage and switching apparatus 210 comprises a system controller 340, a network switch 350, a power distribution/temperature controller unit 380, and a plurality of memory controllers 332 (e.g., memory controllers 332-1, 332-2, . . . , 332-N) each coupled to one or more memory devices 334 (e.g., memory devices 334-1, 334-2, . . . , 334-N).

In one embodiment, the integrated storage and switching apparatus 210 includes a second redundant system controller 340, redundant network switch 350, redundant power distribution and temperature control 280, and/or other redundant components as fail-safe mechanisms to increase reliability of the apparatus 210 such that apparatus 210 can operate in the presence of single, or even multiple failures of any of its components. Furthermore, in one embodiment, links between the components may be redundant in order to further increase reliability of the apparatus 210.

In one embodiment, the memory devices comprise flash memory devices such as, for example, SLC, MLC, TLC, or QLC NAND flash devices or NOR flash devices. Alternatively, the memory devices 334 may include other types of non-volatile memory such as phase changed memory, resistive memory, magnetic memory, magnetic spin torque memory. In yet other embodiments, memory devices 334 may include volatile memory such as DRAM, SRAM, CAM, or the like. Additional components not necessary for understanding the architecture and operation of the integrated storage and switching apparatus 210 are omitted for simplicity of description.

The system controller 340 provides central control functionality for the various components of the integrated storage and switching apparatus 210. For example, the system controller 340 controls a plurality of on-board memory controllers 332 and provides an interface between the memory controllers 332 and the network switch 350. Furthermore, the system controller 340 may include one or more RAID controllers, switches, or other components. The system controller 340 may further control various network settings such as, for example, Quality of Service (QoS) settings, packet prioritization, packet loss policies, and other network management policies.

The memory controllers 332 manage data stored to the memory devices 334 and communicate data between the memory devices 334 and the system controller 340. For example, the memory controllers 332 may perform read, write, and/or erase operations on the memory devices 334 in response to commands from the system controller 340.

The network switch 350 provides routing between the various data links 364 to the system controller 340, the links 368 to the servers 202, and the uplinks 362 (e.g., to an uplink network 204). The network switch 350 receives packets from a connected device (e.g., the system controller 340, the servers 202, or a device coupled to the uplinks 362), determines a destination address for the received packets, and routes the packets to the appropriate destination.

For example, the network switch 350 may receive a data packet from a server 202 for storage. The network switch 350 processes the data packet to determine that it is destined for internal storage and routes the packet to the system controller 340 via links 364. The system controller 340 then controls one of the memory controllers 332 to perform a write operation to write the data to an appropriate memory device 334. Similarly, the network switch 350 may receive a command packet from a server 202 requesting data from storage. The network switch 350 processes the request to determine that it is a request for internally stored data and routes the request to the system controller 340. The system controller 340 then controls one of the memory controllers 332 to read the requested data from the memory device 334. The system controller 340 provides the requested data to the switch 350 for routing to the requesting server 202. In other operations, network switch 350 may similarly route data between an uplink network (via uplinks 362) and the memory devices 334 and/or servers 202.

In one embodiment, the links 364 between the network switch 350 and the system controller 340 are dedicated links and may be implemented as traces between devices on a printed circuit board rather than as external cables (e.g., Ethernet cables) between physically separate devices. Thus, the data communicated over links 364 need not follow signaling requirements of Ethernet and can instead use a customized signaling scheme. This enables high speed connections between the servers 202 and the memory devices 334 without added system complexity and without using up external ports of the switch 350. Furthermore, in one embodiment, redundant links 364 may be employed to ensure that failure of a single link will not cause a system-wide failure of the apparatus 210.

The architecture of the integrated switching and storage apparatus 210 furthermore enables substantial flexibility and optimization of network traffic policies. For example, in one embodiment, system controller 340 controls network switch 350 to operate according to a policy of applying different prioritization levels to processing packets depending on whether they are storage packets (i.e., packets coming to or from storage via links 364) or network packets (i.e., packets coming to or from uplinks 362). In one embodiment, this policy applies a higher prioritization level to storage packets than network packets such that storage packets to or from links 364 are generally processed by switch 350 before network packets to or from uplinks 362. In another embodiment, system controller 340 controls network switch 350 to operate according to a policy of enforcing different acceptable packet loss rates for storage packets coming to or from links 364 and for network packets coming to or from uplinks 362. For example, a maximum acceptable packet loss rate for storage packets may be set to zero or to a very low rate because loss of storage data would be detrimental to operation. On the other hand, packets destined to a client 208 from a server 202 providing services such as voice over IP (VoIP) or streaming media can withstand some packet loss without substantially affecting performance. Therefore, for these types of transmissions, switch 350 may allow some packet loss but more strictly enforce packet ordering and throughput to prevent undesired interruptions in the stream.

In another embodiment, system controller 340 controls network 350 to operate according to a policy of enforcing different a different quality of service (QoS) metric for storage packets coming to or from links 364 and for network packets coming to or from uplinks 362. For example, in one embodiment, network switch 350 ensures a higher QoS for storage packets than for network packets because corruption of data packets would be highly detrimental to operation. The specific QoS metrics may be customized based on a variety of factors such as, for example, allowable latency, throughput, packet loss rate, bit error rate, jitter, out of order packet delivery, etc.

In one embodiment, the integrated storage and switching apparatus 210 is configured to communicate with a management console 370 embodied as software executing on an external client device (e.g., a client 208 on the network 204). A network manager operates the management console 370 to control various network settings of the system controller 340 and switch 350 described above. Furthermore, configuration settings can be communicated from the system controller 340 to network switch 350 via management link 366 that enables the system controller 340 to enforce traffic policies carried out by the switch 350.

In one embodiment, the integrated storage and switching apparatus 210 includes a power distribution and temperature control (e.g., cooling) system 380. Thus, in one embodiment, power temperature control components (e.g., temperature control logic, fans, etc.) is shared by both switching and storage components in contrast to conventional system where two or more separate power and temperature control systems are needed for separate switching and storage devices. This results in both more efficient use of physical space and reduced overall power consumption. In one embodiment, the shared power and temperature control system 380 includes redundant components (e.g., a redundant power supply, redundant fans, redundant temperature control logic, etc.) integrated within the common chassis and shared between the switching and storage components. Furthermore, the links between these components and other components of the integrated storage and switching apparatus 210 may be redundant. This may increase reliability of the apparatus 210 because the failure of a single component will not cause the entire apparatus 210 to fail.

Figure 4:
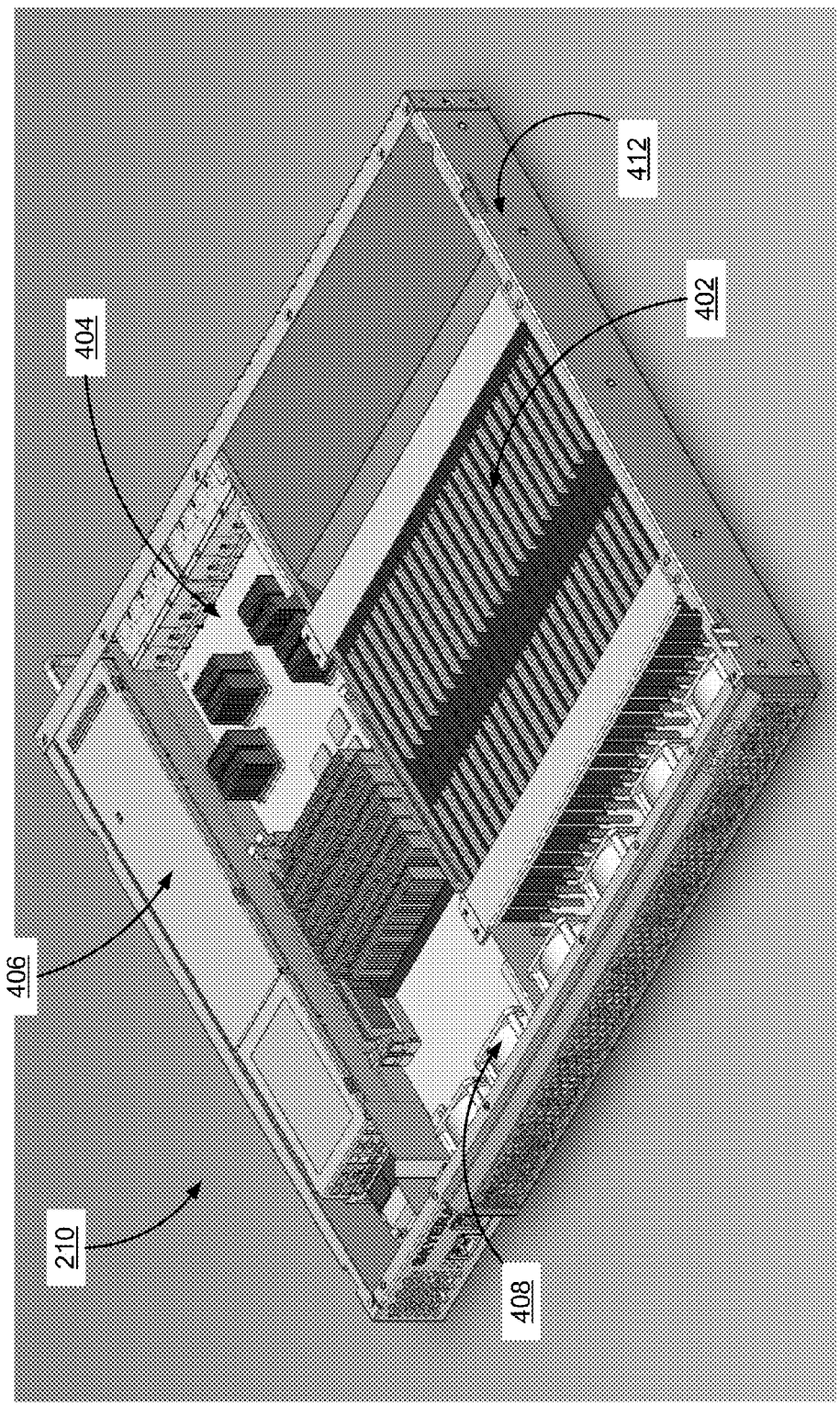
FIG. 4 is a structural diagram illustrating an example embodiment of an integrated storage and switching apparatus according to one embodiment.

FIG. 4 is a structural diagram illustrating an example implementation of a storage and switching apparatus 210. In the illustrated architecture, the integrated storage and switching apparatus 210 is integrated within a 1 U chassis 412 that can fit in a standard server rack. As illustrated the chassis 412 houses both non-memory components such as the network switch 350 and system controller 340 in a first portion 404 of the chassis 412 and memory components (e.g., memory controllers 332 and memory devices 334) in a second portion 402 of the chassis 412. Components such as the system controller 340 and network switch 350 may be mounted to a motherboard (e.g., a printed circuit board) that is oriented horizontally relative to the chassis 412. Connections (e.g., links 364) between the system controller 340 and network switch 350 are implemented directly on the printed circuit board (e.g., as traces on the printed circuit board).

In one embodiment, a plurality of memory devices 334 and one or more memory controllers 322 are implemented on discrete printed circuit boards that are stacked vertically in section 402 of the chassis 412 and connect to the primary printed circuit board via connectors or backplanes. A power supply 406 and fans 408 are also integrated within the chassis to provide power and temperature control in a space efficient manner.

The described embodiments provide an integrated switching and storing apparatus that achieves significant advantages over conventional architectures including, for example, improvements in space efficiency, power efficiency, system complexity, and performance. The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

The invention claimed is:

1. An integrated networked storage and switching apparatus comprising:
   one or more flash memory controllers configured to manage data stored to one or more flash memory devices;
   a system controller coupled to the one or more flash memory controllers, the system controller configured to control the flash memory controllers in response to requests from one or more externals servers to retrieve data from the one or more flash memory devices or write data to the one or more flash memory devices;
   a network switch coupled to the system controller and to the one or more external servers, the network switch configured to route data storage packets between the one or more external servers and the system controller, and to route network packets between the one or more external servers and an uplink network;
   at least one of a redundant system controller, a redundant network switch, and redundant links between the system controller and the one or more flash controllers;
   wherein the system controller is configured to control a plurality of network management settings to apply a first network management setting to the data storage packets and a second network management setting to the network packets;
   wherein the system controller comprises a first integrated circuit and the network switch comprises a second integrated circuit, the first integrated circuit and the second integrated circuit mounted on a common printed circuit board having traces thereon to couple the network switch and the system controller; and
   wherein the flash memory controllers, the system controller and the network switch are integrated within a common chassis.

2. The integrated network storage and switching apparatus of claim 1, wherein the one or more flash memory controllers, the system controller, and the network switch share a common power supply.

3. The integrated network storage and switching apparatus of claim 1, wherein the network switch applies a first traffic prioritization policy to the data storage packets and applying a second traffic prioritization policy to the network packets different than the first traffic prioritization policy.

4. The integrated network storage and switching apparatus of claim 3, wherein the first traffic prioritization policy applied to the data storage packet comprises a higher priority than the second traffic prioritization policy applied to the network packets.

5. The integrated network storage and switching apparatus of claim 1, wherein the network switch is configured to drop packets destined to or from the flash memory device less frequently than packets destined to or from the uplink network.

6. The integrated network storage and switching apparatus of claim 1, wherein the network switch is configured to provide a higher Quality of Service (QoS) for data storage packets than for network packets.

7. The integrated network storage and switching apparatus of claim 1, further comprising:
   a control link between the system controller and the network switch, the control link for communicating switch configuration information from the system controller to control the network management settings of the network switch.

8. The integrated network storage and switching apparatus of claim 1, further comprising:
   a management interface between the system controller and an external management console, the management interface for communicating configuration and policy settings to the system controller from the external management console.

9. The integrated network storage and switching apparatus of claim 1, further comprising:
   a power supply for providing power to the system controller, the network switch, and the one or more flash controllers, the power supply integrated within the common chassis.

10. The integrated network storage and switching apparatus of claim 1, further comprising:
    a temperature control system for regulating temperature of the system controller, the network switch, the one or more flash controller, and the one or more flash memory devices.

11. The integrated network storage and switching apparatus of claim 1, wherein the flash memory controllers are mounted on a first set of printed circuit boards, and wherein the system controller and network switch are commonly mounted on a second printed circuit board, wherein the first set of printed circuit boards are coupled to the second printed circuit via one or more connectors or backplanes.

12. A method for providing network switching and storage in an integrated storage and switching apparatus, the method comprising:
    receiving, by a network switch coupled to a system controller, a plurality of network packets addressed to or from an uplink network and a plurality of data storage packets addressed to or from a storage device controlled by the system controller, the system controller, the storage device and the network switch integrated within a common chassis;
    controlling, by the system controller, a plurality of network management settings to apply a first network management setting to the data storage packets and a second network management setting to the network packets;
    processing the plurality of network packets and the plurality of data storage packets according to a traffic management policy, the traffic management policy assigning a first priority to the data storage packets and assigning a second priority to the network packets;
    transmitting the plurality of network packets and the plurality of data storage packets to their respective destinations according to the priorities in the traffic management policy;
    responsive to a failure of at least one of the network switch, the system controller, and a power supply, operating the integrated storage and switching apparatus using one or more redundant components, the one or more redundant components integrated within the common chassis; and
    wherein the system controller comprises a first integrated circuit and the network switch comprises a second integrated circuit, the first integrated circuit and the second integrated circuit mounted on a common printed circuit board having traces thereon to couple the network switch and the system controller.

13. The method of claim 12, further comprising:
    distributing power to the network switch and the storage device via a common power supply integrated within the common chassis.

14. The method of claim 12, wherein the first priority assigned to the data storage packets comprises a higher priority than the second priority applied to the network packets.

15. The method of claim 12, further comprising:
- enforcing a first maximum acceptable packet loss rate to the data storage packets to or from the storage device; and
- enforcing a second maximum acceptable packet loss rate to the network packets to or from the uplink network, the second maximum acceptable packet loss rate higher than the first maximum acceptable packet loss rate.

16. The method of claim 12, further comprising:
- enforcing a first Quality of Service (QoS) policy to the data storage packets to or from the storage device; and
- enforcing a second QoS to the network packets to or from the uplink network, the second QoS policy different than the first QoS policy.

17. The method of claim 12, further comprising:
- communicating configuration information from the system controller to the network switch, the configuration information to control the network management settings of the network switch.

\* \* \* \* \*